United States Patent
Taner et al.

(10) Patent No.: US 6,374,185 B1
(45) Date of Patent: Apr. 16, 2002

(54) METHOD FOR GENERATING AN ESTIMATE OF LITHOLOGICAL CHARACTERISTICS OF A REGION OF THE EARTH'S SUBSURFACE

(75) Inventors: M. Turhan Taner, Houston; Naum M. Derzhi, Sugar Land, both of TX (US); Joel D. Walls, Morgan Hill, CA (US)

(73) Assignee: RDSP I, L.P., Houston, TX (US)

( * ) Notice: Subject to any disclaimer, the term of this patent is extended or adjusted under 35 U.S.C. 154(b) by 0 days.

(21) Appl. No.: 09/507,028

(22) Filed: Feb. 18, 2000

(51) Int. Cl.$^7$ ................................................ G01V 1/40
(52) U.S. Cl. ............................ 702/6; 367/73; 702/14
(58) Field of Search ............... 367/73, 38; 702/7, 702/9, 11, 12, 13, 14, 16, 17, 6; 703/10

(56) References Cited

U.S. PATENT DOCUMENTS

| | | | |
|---|---|---|---|
| 4,969,130 A | * 11/1990 | Wason et al. | 367/73 |
| 5,444,619 A | * 8/1995 | Hoskins et al. | 702/13 |
| 5,648,939 A | * 7/1997 | Folstad et al. | 367/73 |
| 5,691,958 A | 11/1997 | Calvert et al. | |
| 5,706,194 A | * 1/1998 | Neff et al. | 702/14 |
| 5,828,981 A | 10/1998 | Callender et al. | |
| 5,835,883 A | * 11/1998 | Neff et al. | 702/7 |
| 5,838,634 A | * 11/1998 | Jones et al. | 367/73 |
| 5,862,513 A | * 1/1999 | Mezzatesta et al. | 702/9 |
| 5,940,777 A | 8/1999 | Keskes | |
| 6,058,073 A | * 5/2000 | VerWest | 367/31 |

OTHER PUBLICATIONS

Michael Batzle and Zhiging Wang; Seismic properties of pore fluids; Geophysics; Nov. 1992; p. 1396–1408; vol. 57; No. 11.

M. A. Biot; Theory of Propagation of Elastic Waves in a Fluid–Saturated Porous Solid. I. Low–Frequency Range and II. Higher Frequency Range; The Journal of the Acoustical Society of America; Mar. 1956; p. 168–191; vol. 28; No. 2.

Fritz Gassmann; Uber die elastizitat poroser medien (English translation); Vier. Der Natur Gesellschaft; 1959; 96; p. 1–23; Zurich, Switzerland.

Michael D. McCormack; Neural computing in geophysics; Geophysics: The Leading Edge of Exploration; Jan. 1991; p. 11–15; vol. 10; No. 1.

M. Turhan Taner; Seismic attributes revisited; 64$^{th}$ Annual International Meeting, SEG Expanded Abstracts; 94; p. 1104–1106.

M. T. Taner, F. Koeher and R. E. Sheriff; Complex seismic trace analysis; Geophysics; Jun. 1979; p. 1041–1063; vol. 44; No. 6.

* cited by examiner

*Primary Examiner*—Donald E. McElheny, Jr.
(74) *Attorney, Agent, or Firm*—E. Eugene Thigpen

(57) ABSTRACT

The invention in a first embodiment comprises a system for generating an estimate of lithological characteristics of a region of the earth's subsurface. A correlation is generated between attributes of synthetic seismic data calculated from log data from at least one wellbore penetrating said region and lithological information from said at least one wellbore. The correlation is then applied to recorded seismic data from the region of the earth's subsurface to generate the estimate.

13 Claims, 5 Drawing Sheets

1- PURE SHALE
2- SILTY SHALE
3- INTERBEDDED SANDSTONE-SHALE
4- MASSIVE WET SAND
5- UNCONSOLIDATED WET SAND
6- PLANAR LAMINATED OIL SAND
7- UNCONSOLIDATED OIL SAND
8- UNDEFINED

METHOD FOR GENERATING AN ESTIMATE OF LITHOLOGICAL CHARACTERISTICS OF A REGION OF THE EARTH'S SUBSURFACE

BACKGROUND OF THE INVENTION

1. Field of the Invention

This invention is related to the use of well data and seismic data to predict subsurface lithology.

2. Description of Related Art

For many years seismic exploration for oil and gas has been conducted by use of a source of seismic energy and the reception of the energy generated by the source by an array of seismic detectors. On land, the source of seismic energy may be a high explosive charge or another energy source having the capacity to deliver a series of impacts or mechanical vibrations to the earth's surface. Acoustic waves generated by these sources travel downwardly into the earth's subsurface and are reflected back from strata boundaries and reach the surface of the earth at varying intervals of time, depending on the distance traveled and the characteristics of the subsurface traversed. These returning waves are detected by the sensors, which function to transduce such acoustic waves into representative electrical signals. The detected signals are recorded for later processing using digital computers. Typically, an array of sensors is laid out along a line to form a series of detection locations. More recently, seismic surveys are conducted with sensors and sources laid out in generally rectangular grids covering an area of interest, rather than along a single line, to enable construction of three dimensional views of reflector positions over wide areas. Normally, signals from sensors located at varying distances from the source are added together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional data.

Initially, seismic traces were used simply for ascertaining formation structure. However, in 1979, Taner et al. published the work "Complex Seismic Trace Analysis", Geophysics, Volume 44, pp. 1041–1063, and exploration geophysicists have subsequently developed a plurality of time-series transformations of seismic traces to obtain a variety of characteristics that describe the traces, which are generally referred to as "attributes". Attributes may be computed prestack or poststack. Poststack attributes include reflection intensity, instantaneous frequency, reflection heterogeneity, acoustic impedance, velocity, dip, depth and azimuth. Prestack attributes include moveout parameters such as amplitude-versus-offset (AVO), and interval and average velocities.

It has been observed that specific seismic attributes are related to specific subsurface properties. For example, acoustic impedance may be related to porosity. Other subsurface properties appear to be related to other seismic attributes, but it may be unclear what the relationship is, as local factors may affect the data in unexpected ways.

It is well known to employ well logs, such as wireline well logs, and data from core samples extracted from wellbores, to accurately determine petrophysical properties of subterranean formations penetrated by the wellbores. Petrophysical properties of subterranean formations which can be obtained from well logging or core sample operations include lithological composition, porosity, and water or hydrocarbon saturation. This information is valuable for determining the presence and extent of hydrocarbons in the area of interest. However, the portion of subsurface formations which can be measured by such well log and core data is limited in areal extent, e.g. to about six to twelve inches around the borehole from which the measurements were taken, and the petrophysical properties of a subterranean formation can vary widely in the interwell locations.

Synthetic seismic traces may be generated from well log data, typically from sonic and formation density logs. As used herein a synthetic seismic trace is an artificial seismic signal developed mathematically from a model of subsurface strata and an assumed signal source. A synthetic seismic trace is useful for demonstrating the form that a real seismic trace should take in response to the geologic conditions near the well.

Frequently, both well logging data and seismic data are available for a region of the earth which includes a subsurface region of interest. Core data may also be available. Typically, the well log data and, if available, the core data, are utilized for constructing a detailed log, or column, of subsurface properties. The seismic data, which includes data gathered in the interwell region of interest, is then utilized to estimate the structure of the subsurface formation extending between well locations. Subsurface formation property mapping, however, is typically based solely on the wireline log and core sample data. More recently, however, a number of proposals have been made for using seismic data gathered from the interwell region to improve the estimation of formation properties in the interwell region.

U.S. Pat. No. 5,444,619, which issued on Aug. 22, 1995 to Hoskins et al. discloses a method for predicting oil reservoir properties which utilizes seismic data and wellbore data. Seismic data are related to wellbore data to determine the approximate intersections of the seismic and wellbore data (i.e. seismic reflectors are correlated to geological markers in the wellbore). Nonrandom matches between the seismic data and the wellbore data were estimated and the relationship between the seismic data and the wellbore data were then calibrated by training an Artificial Neural Network (ANN). The ANN was then used to predict reservoir properties based on the seismic data. The method includes five principal steps. In the first step, seismic data, which are measured in time, and well data, which are measured in depth, are correlated to relate seismic reflectors to geological markers in the well data. In the second step, wellbore data from multiple wells are extracted from horizon intersections and a significance estimation is utilized to calculate the probability of specific seismic attributes and specific wellbore data not being randomly related. In the third step, a linear calibration is performed between reservoir properties and seismic data, for relationships that are linear. For nonlinear relationships an artificial neural network (ANN) is utilized to learn a nonlinear model using example well data and seismic data. In the fourth step, the reservoir property at locations of interest between wells is calculated by inputting seismic attributes at the locations of interest to the trained ANN, which calculates the reservoir property. In the fifth step, for estimates which do not exactly agree with borehole measurements, geostatistical methods, such as cokriging or gridding the differences between the calibrated attributes, are used to produce a seismic guided estimate that complies with the well data.

U.S. Pat. No. 5,691,958, which issued on Nov. 25, 1997 to Calvert et al. discloses a method for predicting properties of a subsurface formation which utilizes data from a calibration well and a set of seismic traces from the subsurface formation. A synthetic seismogram is generated which is representative of the subsurface formations proximate to the calibration well. A study interval of the subsurface formation is identified and this interval is identified on both the synthetic seismogram and the seismic data traces. One or more seismic attributes are selected for calibration and the calibration attributes are extracted from the study interval on both the synthetic seismogram and the seismic data traces. Subsurface formation properties proximate to the calibration well are determined from the well data. One or more seismic data traces which have calibration attributes for the study interval which approximate those of the synthetic seismogram are selected. A calibration model is then constructed for the subsurface formation using the calibration attributes extracted firm the selected seismic data traces and the formation properties proximate to the calibration well. The calibration model is then used to predict subsurface formation properties for the subsurface formations. For each calibration attribute, the attributes extracted from each seismic interval for each real trace are regressed against the same attributes for the corresponding interval of the synthetic seismogram.

U.S. Pat. No. 5,706,194, which issued on Jan. 6, 1998 to Neff et al. discloses a method for converting real seismic traces and lithologic well log data into a model image of subterranean characteristics and structure. A lithological model is developed which agrees with measured sonic, density and layer thickness well logs. Seismic trace data corresponding to the well location is paired with the lithological data. Forward model perturbation techniques are used to construct pseudo-logs at a desired number of forward model sites away from the well. Based on these pseudo-logs, a corresponding number of synthetic seismic traces are determined so that each forward model is associated with a seismic trace that matches the lithologic parameter of the pseudo log. In this manner a catalog of synthetic seismic model traces and corresponding pseudo logs are generated and stored in memory. Every synthetic model trace is compared to each real seismic trace, and several different synthetic seismic model traces are selected for each real seismic trace that "best fits" the real seismic trace in some manner. Next, the petrophysical properties modeled in the several pseudo-logs corresponding to the several "best fit" synthetic seismic traces corresponding to a specific forward model site are numerically compared to the corresponding petrophysical properties modeled by the pseudo-logs at adjacent forward model sites. Finally, a single pseudo-log is chosen for each forward model site based on the numerical values determined in the coherence analysis scheme for comparing petrophysical properties at adjacent forward model sites, and the chosen property for each model site is assigned to a display model which is a visual representation of lithologic characteristics of subsurface formations.

U.S. Pat. No. 5,940,777, which issued on Aug. 17, 1999 to Keskes, and is based on earlier published PCT Publication Number WO97/11392, discloses a method for the automatic recognition of seismic facies in a region between two horizons or about a horizon of a geological area. The number of seismic facies to be recognized is determined and a set of seismic trace portions from the geological area is selected. A facies recognition parameter common to all the trace portions is defined and a value of the parameter for each of the trace portions is determined. A number of trace portions is selected from the set and an artificial neural network containing as many cells as facies to be recognized is made to learn from the selected trace portions so that when the learning is complete, each cell corresponds to at least one of said facies to be recognized and the facies are gradually ordered. Each trace portion of the set to be processed is then presented to the classified and ordered neural network and a number is assigned to the nearest cell to each of the trace portions presented to the network. While this method makes use of a neural network, no use is made of wellbore data.

U.S. Pat. No. 5,828,981, which issued on Oct. 27, 1998 to Callender et al. discloses a method for determining the pore type of earth formations penetrated by a borehole from well logs of the borehole. The method utilizes core sample data and wireline well log data, and also utilizes a neural network. The method makes no use of seismic data, however. The neural network is trained by inputting depth aligned wireline log data from well intervals where there is no core samples in order to produce synthetic outputs of pore type properties.

A need continues to exist, however, for an improved method for utilizing seismic data to estimate lithological characteristics of the earth's subsurface.

It should be noted that the description of the invention which follows should not be construed as limiting the invention to the examples and preferred embodiments shown and described. Those skilled in the art to which this invention pertains will be able to devise variations of this invention within the scope of the appended claims.

SUMMARY OF THE INVENTION

The invention in a first embodiment comprises a system for generating an estimate of lithological characteristics of a region of the earth's subsurface. A correlation is generated between attributes of synthetic seismic data calculated from log data from at least one wellbore penetrating said region and lithological information from said at least one wellbore. The correlation is then applied to recorded seismic data from the region of the earth's subsurface to generate the estimate.

In another embodiment, the invention comprises a system for generating an estimate of lithological characteristics of a region of the earth's subsurface penetrated by a plurality of wellbores in which a lithological column is developed from core data from at least one of the wellbores. A correlation is developed between the lithological column and log data from said at least one of the wellbores. Log data from at least one of the wellbores is utilized to develop log data representing at least one model well. A correlation between the lithological column and log data is applied to log data from the plurality of wellbores and said at least one model well to generate lithological information for the plurality of wellbores and said at least one model well. Synthetic seismic traces are calculated from log data from the plurality of wellbores and from at least one model well, and attributes of these synthetic seismic traces are calculated. A correlation is generated between the attributes of the synthetic seismic traces and the lithological information. Attributes of recorded seismic traces from the region are then calculated and the correlation between the attributes of the synthetic seismic traces and the lithological information are applied to the attributes of the recorded seismic traces to generate the estimate of lithological characteristics.

DESCRIPTION OF PREFERRED EMBODIMENTS

Figure 1:
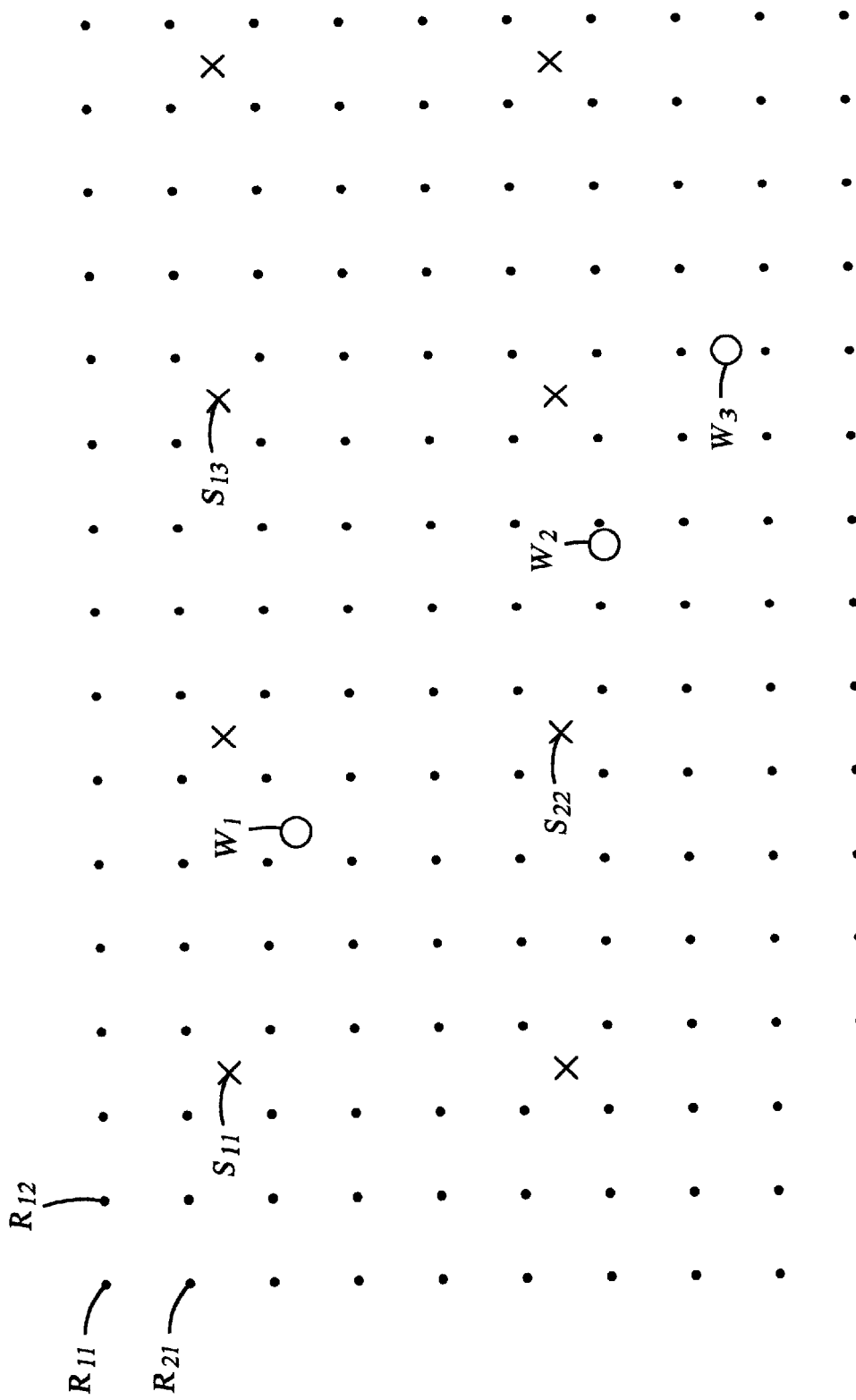
FIG. 1 shows a region of the earth's surface in which wells have been drilled and seismic data have been gathered.

This invention utilizes well data and seismic data from a subsurface region of interest to improve the prediction of lithological characteristics of the subsurface region. As used herein, the term "lithological characteristics" shall be deemed to include any of the following: mineralogy, porosity, fluid content, fluid pressure and bedding configuration. If available, core data may also be utilized in performing the invention. In describing the preferred embodiments of the invention, it will be assumed that well log data and seismic data are available from the region of interest, and that core data may also be available. FIG. 1 shows a typical region of interest having three well locations (W1, W2 and W3), a grid of seismic source locations (three of which are identified as $S_{11}$, $S_{13}$ and $S_{22}$) and a finer grid of seismic receiver locations (three of which are identified as $R_{11}$, $R_{12}$ and $R_{21}$).

Figure 2:
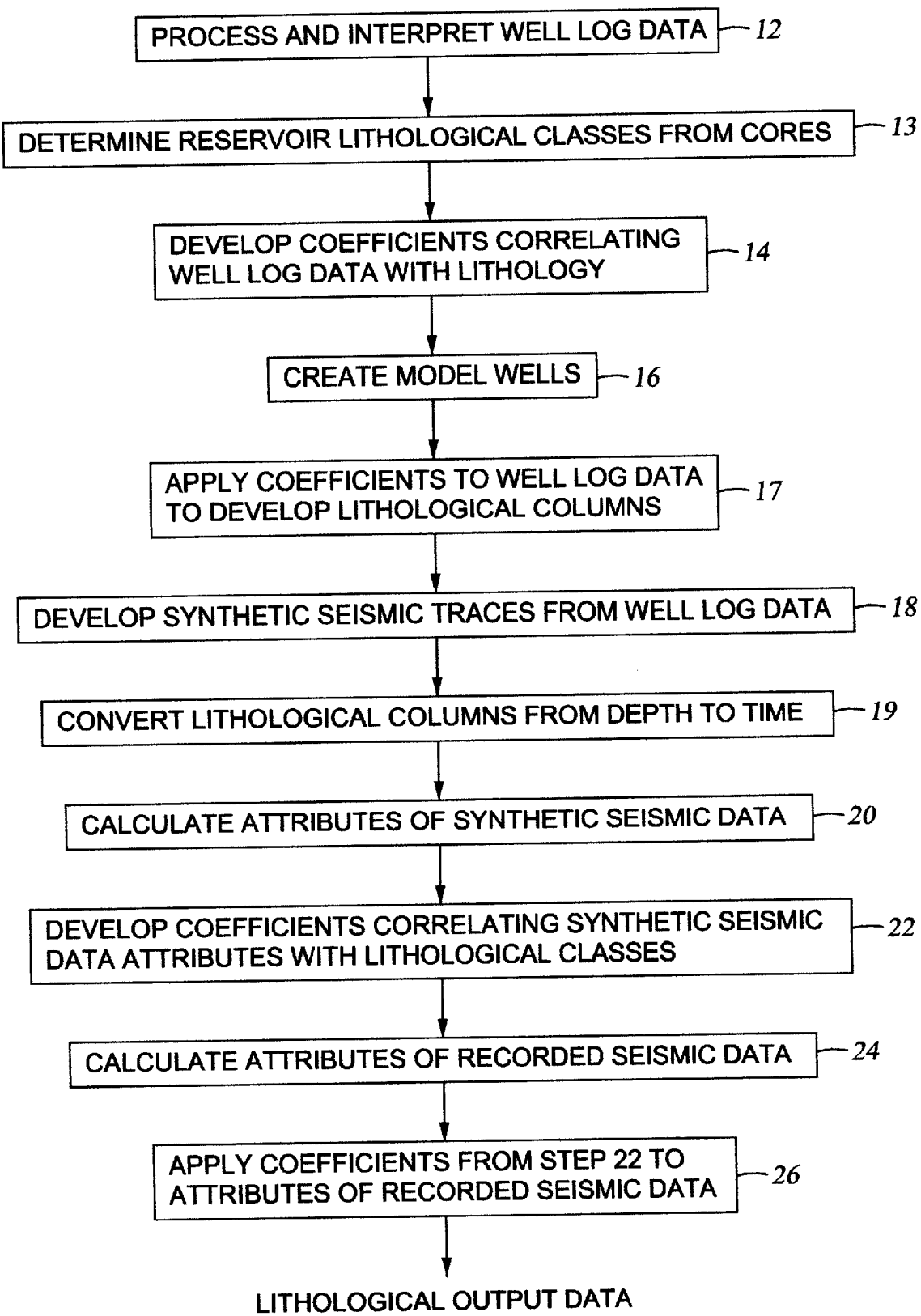
FIG. 2 is a flow diagram outlining steps that may be performed in a particular implementation of the invention.

FIG. 2 is a flow diagram outlining steps that may be performed in a particular implementation of the invention. With reference to step 12, well logs which may be useful in performing the invention include, but are not limited to, gamma ray, neutron, density, sonic (compression wave velocity), deep resistivity, caliper, shallow resistivity, and shear wave velocity logs. Shale volume may be determined from the gamma-ray, neutron and density logs, by methods known to those of ordinary skill in the art. Total porosity may be determined, by methods known to those of ordinary skill in the art, from the density logs, or from an average of the density logs and the neutron logs, and water saturation may be determined from resistivity logs. Those of ordinary skill in the art will recognize that the well log data utilized to implement this invention may be utilized for other purposes as well, and that such well log data may have been processed and interpreted for other reasons and may be available prior to performance of the present invention.

In step 13 of FIG. 2, cores from at least a portion of the wellbores penetrating the regions of interest are analyzed to determine boundaries of lithological classes present in the region of interest. In general, the lithological classes are sedimentary units having distinguishable characteristics, such as clay content, bedding configuration, grain size, cementation, and rock mineral properties. A typical set of lithology classes are as follows:

1) pure shale
2) silty shale
3) interbedded sandstone-shale
4) massive wet sand
5) unconsolidated wet sand
6) planar laminated oil sand
7) unconsolidated oil sand
8) gas sand
9) undefined.

Figure 4:
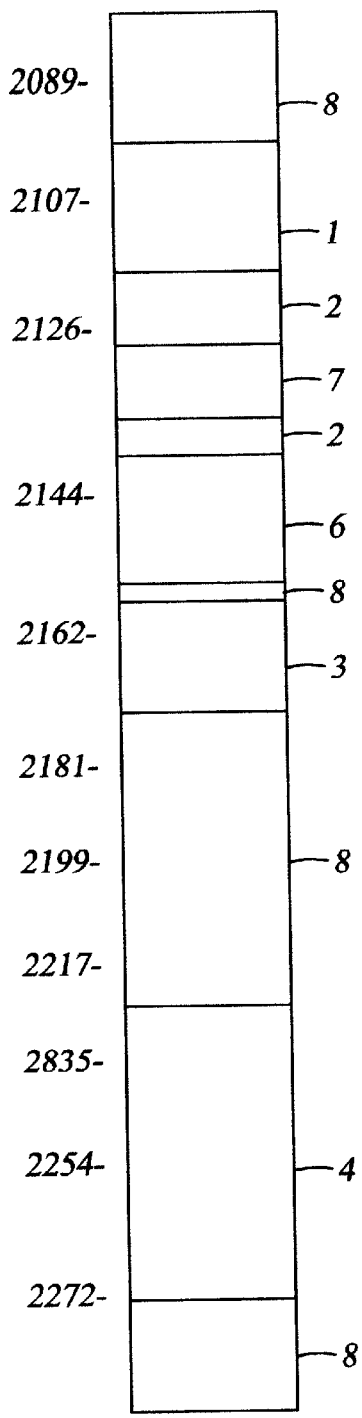
FIG. 4 shows an example of a lithological column.

A distribution of these boundaries of lithological classes along the length of a wellbore will be referred to hereinafter as a lithological column. An example of a lithological column, derived as a part of test results discussed below, is shown in FIG. 4. The lithological column shown in FIG. 4 does not, however, represent all possible lithological classes.

Those of ordinary skill in the art will recognize that core data utilized to implement this invention may be utilized for other purposes as well, and that the boundaries of lithological classes present in the region of interest may have also been determined for other purposes and may be available prior to performance of the present invention.

In step 14 of FIG. 2, the lithological column (or columns) determined from the cores in step 13 are depth correlated with the well log data, and the lithological column, along with well log data are applied to an artificial neural network, of a type known to those of ordinary skill in the art, and the artificial neural network is utilized to train the well log data to predict litholoy. Well log data which may be applied to the artificial neural network for this purpose include gamma ray, neutron, resistivity, SP (spontaneous potential), density, total porosity, compression wave velocity ($V_p$), shear wave velocity ($V_s$), shale volume, and water saturation well log data. The artificial neural network develops weights and scalers, referred to hereinafter as "coefficients", by iterative correlation of the well logs with the lithologic columns to minimize the discrepancies between the lithology predictions from the well logs and the actual lithological classes determined from core data.

In step 16 of FIG. 2, logs for additional "model" wells are created, based on the data for the actual wells, but with the lithology modified so that at least a portion of the model well represents lithology which may be present in the subsurface region of interest but may not be depicted by the actual wells. For example, from the log data for wells which contain oil bearing structures, model wells may be created with the oil-bearing structures replaced with non-oil bearing structures. And for wells containing no oil-bearing structures, oil-bearing structures may be added. Other lithological modifications may also be made. Logs for the model well may be created by utilizing known rock physics relations, which are well known to those of ordinary skill in the art, including the Biot-Gassmann relation. If well log data are available for only a small number of wells in a region of interest, the use of model wells may significantly enhance the results of the present invention. However, the improvement afforded by use of model wells may diminish as the number of wells from which well log data are available increases, and in another embodiment of the invention, the model wells are not utilized.

Coefficients developed by the artificial neural network in step 14 are then applied in step 17 to the well logs from both the actual wells and the model wells to develop lithological columns for each well and model well.

In step 18, synthetic seismic traces are derived from the acoustic parameters for each well and model well, based on extracted wavelets and acoustic parameters. Well log acoustic parameter inputs for generating the synthetic seismograms may include $V_p$, $V_s$, attenuation and density. The wavelet may be extracted from seismic data traces, recorded at locations around the well, by deconvolution methods known to those of ordinary skill in the art. For example, a 9×9 grid of seismic data traces recorded from locations around a well may be utilized, and the average of the wavelets determined for each of these data traces used as the extracted wavelet for calculating a synthetic seismic trace. A stacked synthetic seismic trace may then be generated for each well location by using a plurality, such as ten, of synthetic seismic traces calculated for locations near the well, and having offsets spanning a range of 0 to 5000 meters. Normal moveout is applied to the seismic traces in this synthetic offset model and the traces summed to generate the stacked synthetic trace.

The lithological columns developed in step 17 are then converted in step 19 from depth to time corresponding to the time-depth conversion of the synthetic seismograms. At this point a time converted lithological column and a synthetic seismogram is available for each well, including the model wells.

In step 20, various "attributes" are derived from the synthetic seismic data traces. Attributes that may be utilized include, but are not limited to: real part of complex trace, imaginary part of complex trace, trace envelope, time derivative of the envelope, second derivative of the envelope, instantaneous phase, instantaneous frequency, envelope weighted instantaneous frequency, thin bed indicator, acceleration of phase, dominant frequency, band width, instantaneous Q factor, normalized amplitude, envelope amplitude modulated phase, relative acoustic impedance, AVO—gradient, AVO—gradient x intercept and interval velocities.

In step 22, an artificial neural network is utilized to train the synthetic seismic data trace attributes to recognize lithological classes. The time domain lithological columns and sets of attributes from the synthetic seismograms are applied to an artificial neural network to develop weights and scalers, referred to hereinafter as "coefficients", by iterative correlation to improve the correlation between the lithological classes predicted by the attributes from the synthetic seismogram and the actual lithological classes from the time domain lithology columns. Various combinations of attributes may be utilized to find the attributes that provide the best prediction of lithology for the particular region of interest. This process is repeated until an acceptable convergence is achieved, at which point the network was deemed to have been trained. Because the synthetic seismograms are used in the training step instead of actual seismic traces there is no ambiguity in the time-depth match or "tie" as is the case in other methods. The use of synthetic seismic traces based on the log data from the model wells may expand the training set and thereby enhance the invention, because the model wells may include lithological classes that may exist between wells but are not represented in the actual wells.

Figure 5:
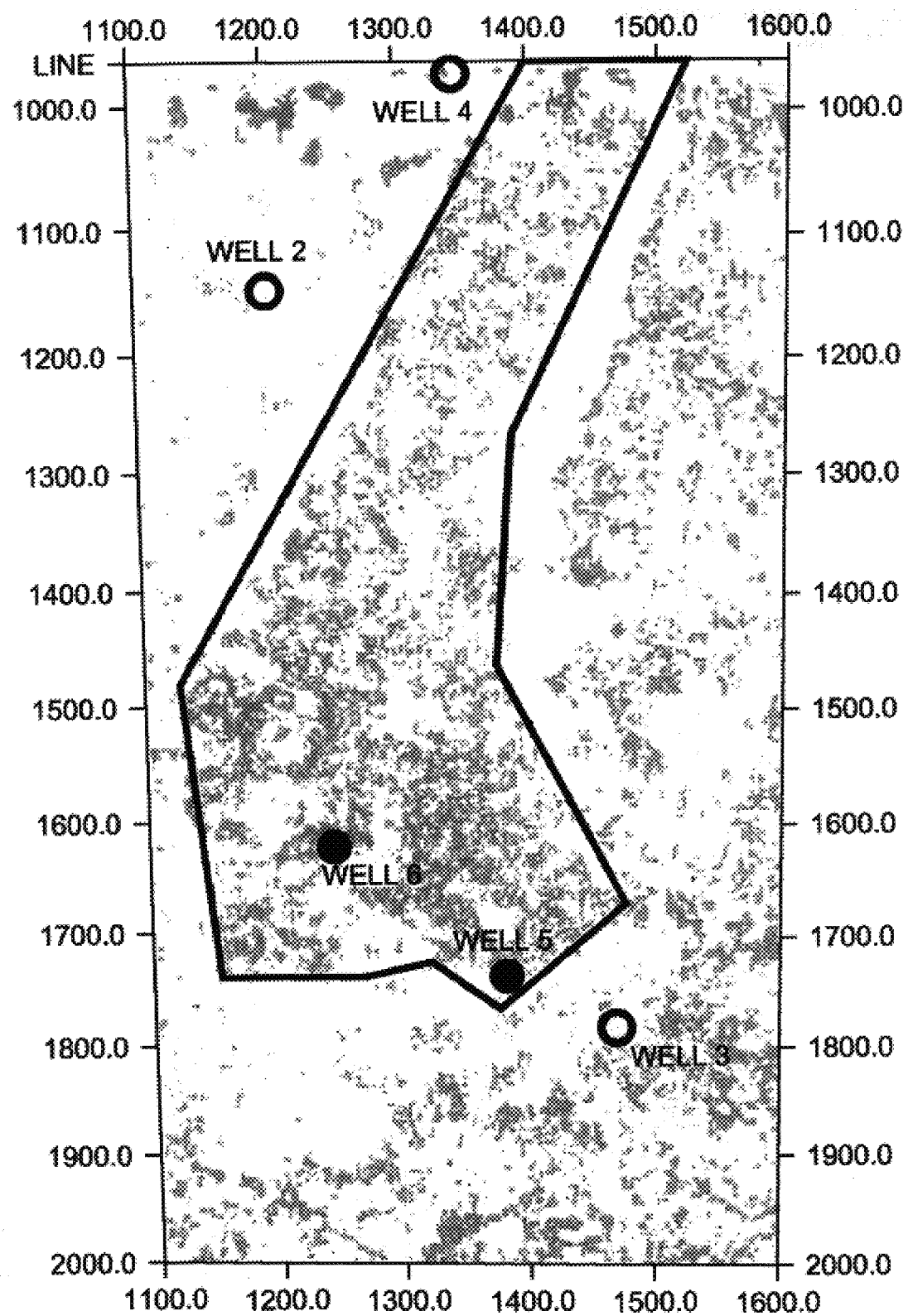
FIG. 5 shows a result of use of the invention in the form of a formation image flattened on a time horizon.

In step 24, seismic attributes from the real seismic data traces recorded in the interwell region are computed. In step 26, the coefficients which were derived by the artificial neural network in step 22 are applied to the attributes derived from the real seismic data from the interwell region to generate lithological output data comprising lithological classes for the interwell locations in the region of interest from which the seismic data were recorded. The lithological output data is normally recorded on a storage medium, such as magnetic tape or a magnetic disk. To facilitate use of such lithological data by an explorationist, the data are imported into a commercially available interpretation software package which is utilized to generate visual displays of the data. Such interpretation software packages are generally available to the industry. An example of such a display is shown in FIG. 5. Such displays are normally viewed on a computer monitor or on a paper printout, or on computer generated three-dimensional displays.

Figure 3:
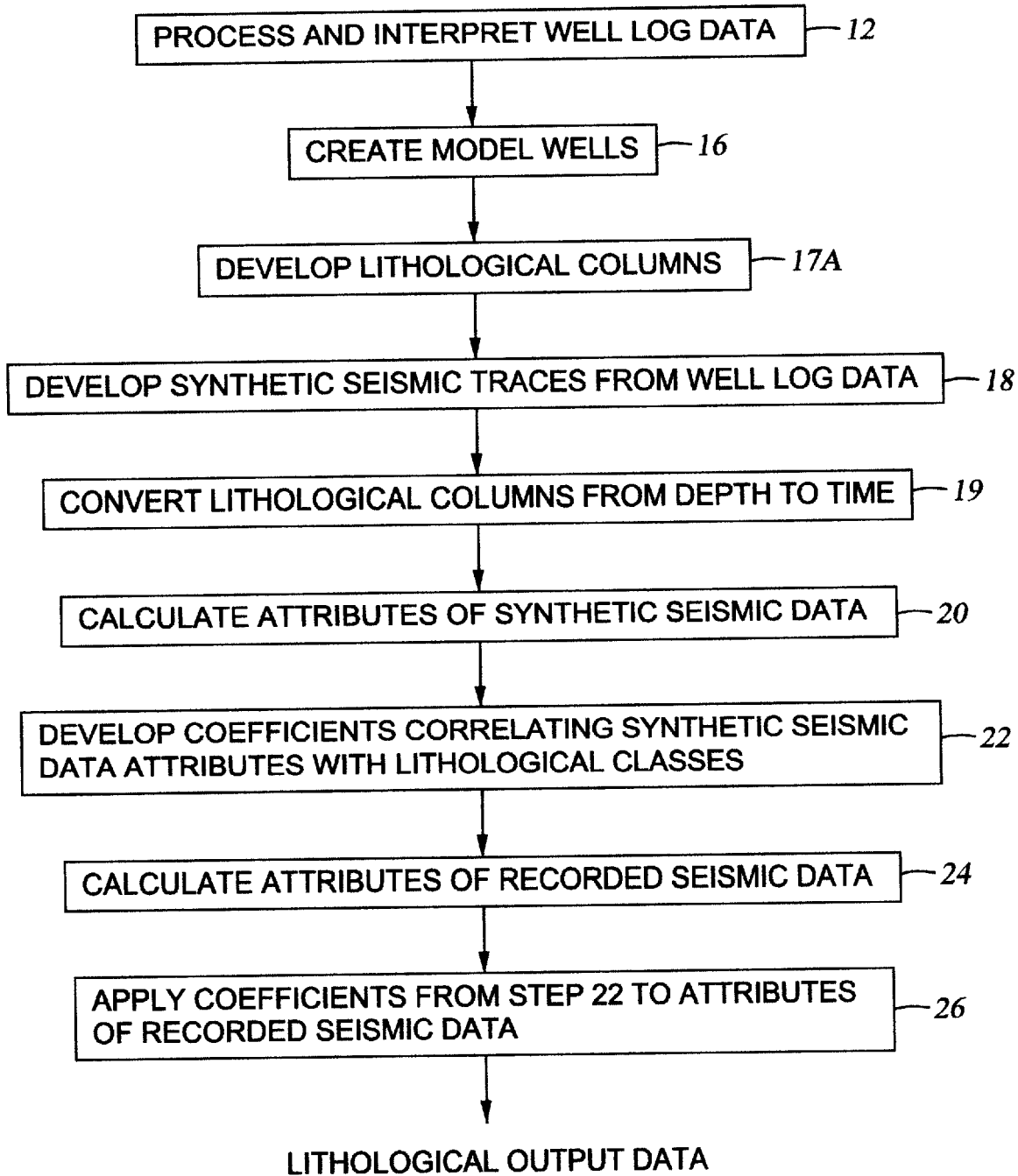
FIG. 3 is a flow diagram outlining steps that may be performed in another implementation of the invention.

Another preferred embodiment of the invention, in which the invention is practiced without the use of core data, is outlined in FIG. 3. In this embodiment, steps 13 and 14 of FIG. 2 are not performed. In step 17A, which is performed in lieu of step 17 of FIG. 2, the lithological columns for the wells (and for the model wells, if model wells are used) are derived directly from well log data, according to relationships known to those of ordinary skill in the art. Steps 18, 19, 20, 22, 24 and 26 are then performed in the same manner as in the embodiment of the invention outlined in FIG. 2. It is understood also, that this embodiment of the invention may also be practiced without the use of the model wells.

In some situations some core data may be available, but an insufficient amount to develop lithological columns as outlined with respect to step 13 of FIG. 2. In such situations, the core data may be utilized as a check against the lithological classes determined from well log data or to depth calibrate well log interpretations.

Although the use of an artificial neural network has been included in the performance of steps 14 and 22 of preferred embodiments of the invention, those of ordinary skill in the art will recognize that the artificial neural network is just one method of establishing a correlation between the attributes or well logs and lithologies. Others statistical techniques, such as linear regression, multiple regression, linear discriminant analysis and clustering methods could also be utilized, and the use of any such statistical technique is deemed to be within the scope of this invention.

Those of ordinary skill in the art will recognize that the steps of this invention will normally be implemented on a digital computer, and that computer instructions readable by a digital computer and defining the method of the invention will be stored on a storage medium such as magnetic tape, a magnetic or optical disk or an equivalent storage device and will instruct the computer to perform the method. Normally, the instructions stored on the storage medium will include at least instruction for performing steps 14, 16, 17, 18, 19, 20, 22, 24 and 26 if core data is available and model wells are to be generated. If core data are not available, step 17A is performed in lieu of steps 14 and 17. If model well are not utilized, step 16 would not be performed.

Test Results

A test was performed in a North Sea tertiary turbidite system which covered an area of about 325 square kilometers. There were five wells inside the survey area, two of which had encountered oil saturated pay sands, and three of which had not. The pay sands in the two producing wells were in the Heimdal Formation. The non-producing wells either had no pay sands in the Heimdal Formation or did not encounter the Heimdal Formation.

Well logs, including gamma ray, neutron, density, sonic, deep resistivity and caliper logs were available from the five wells. Shallow resistivity logs were available from some of the wells. Dipole shear wave velocity data were available from the two producing wells. These well logs were then utilized to compute total porosity, shale volume, and water saturation for the zones of interest, primarily sand-shale sequences between depths of 2100 and 2300 meters. Shale volume was determined from the gamma-ray, neutron and density logs. Total porosity was primarily determined from the density logs; however, in hydrocarbon-bearing intervals, an average of the total porosity determined from the density logs and from the neutron logs was utilized. Water saturation was determined from resistivity logs.

Shear wave velocity were not available from the non-hydrocarbon producing wells, and predictions of the shear wave velocities for these well were derived from the available compression wave velocity, porosity, lithology, and fluid saturation data. The Castagna "mudrock" equation was used to derive shear wave velocity for the three non-producing wells for which shear wave velocity data were not available.

The Castagna "mudrock" equation was calibrated with the measured shear wave velocities from the two producing well. The relationship derived was:

$V_s = 0.73 V_p - 767$ meters/second in which $V_s$ is shear wave velocity in meters per second, and $V_p$ is compression wave velocity in meters per second. Only the water saturated portions of the wells were used to establish the calibration.

Additional "model" wells were created using the Biot-Gassmann relations. In these model wells, for the wells which contained oil bearing zones, well logs were created as if the oil were not present, and for the wells which contained no oil bearing sands, well logs were created as if the oil were present. The following properties were used for the solids and fluids to create the model wells:

Solids:
  Quartz: K=36.6 Gpa; u=45 Gpa; rho=2.65 g/cm$^3$
  Shale: K=20.8 Gpa; u=6.9 Gpa; rho=2.58 g/cm$^3$
Fluids:
  Oil: 32 API; GOR=65 L/L
  Brine: 60,000 PPM NaCl (~0.05 Ohm-m @80C)
where:
  K=bulk modulus
  Gpa=10$^9$ pascal
  rho=density
  API=weight or "gravity" of crude oil
  GOR=gas-oil ratio
  L/L=liters per liter.

Cores from a 75 meter length of one of the non-producing wells were used for the identification of the lithological classes in the survey site. The following classes were identified: 1) pure shale; 2) silty shale; 3) interbedded sandstone-shale; 4) massive wet sand; 5) unconsolidated wet sand; 6) planar laminated oil sand; 7) unconsolidated oil sand; and 8) undefined.

The patterns between lithological classes and well log data were then determined by use of an artificial neural network, which trained the well log data to recognize the lithology classes. In addition to the lithologic column data, density, total porosity, $V_p$, $V_s$, shale volume, and water saturation well log data were provided as inputs to the artificial neural network. The training was done on a limited range of depths, from 2100 meters to 2300 meters, which encompassed the formation interval. An example of this classification for Well 5 is shown in FIG. 4. Once the training operations were completed, the artificial neural network coefficients were applied to the well logs to obtain a lithology classification at each well, including the model wells.

Synthetic seismic traces were then calculated for each well, including the model wells, and seismic attributes were then calculated from the synthetic seismic traces and employed in the artificial neural network training phase. In the artificial neural network training phase, the artificial neural network used the seismic trace attributes and time-converted lithology class information, in an iterative process, to develop a prediction of lithology classes by the seismic trace attributes. This iteration continued until the discrepancy between the predicted lithology classes and the actual classes was at an acceptable minimum. In the study, numerous combinations of attributes were attempted and ultimately five attributes (trace envelope, time derivative of the envelope, second derivative of the envelope, instantaneous phase, and instantaneous frequency) that gave acceptable results were chosen.

The five attributes chosen were then calculated for the recorded seismic data traces from the region of interest. The developed coefficients were then applied to the attribute data from the recorded seismic data traces to develop the lithology classification prediction. Lithology classification was performed on a sample-by-sample basis on the attributes computed from the entire 3-D seismic volume.

The resulting lithology predictions were then imported into a commercially available volume visualization software package. The resulting images of the formation were flattened on a time horizon that corresponded to the midpoint of the pay sand near the two producing wells. FIG. 5 shows a time slice through this flattened horizon in which the oil sand lithologies are depicted by grey shading and all non-reservoir quality lithologies are white. The in-line and cross-line grids are trace numbers.

While the invention has been described and illustrated herein by reference to certain preferred embodiments in relation to the drawings attached hereto, various changes and further modifications, apart from those shown or suggested herein, may be made herein by those skilled in the art, without departing from the spirit of the invention, the scope of which is defined by the following claims.

We claim:

1. A method for generating an estimate of lithological characteristics of a region of the earth's subsurface, comprising:
   generating a correlation between attributes of synthetic seismic data calculated from log data from at least one wellbore penetrating said region and lithological information from said at least one wellbore; and
   applying said correlation to attributes of recorded seismic traces from said region of the earth's subsurface to generate said estimate.

2. The method of claim 1 wherein said correlation between attributes of synthetic seismic data calculated from log data from at least one wellbore penetrating said region and lithological information from said at least one wellbore is generated by steps, comprising:
   developing a lithological column from core data from at least a portion of said at least one wellbore;
   developing a second correlation between said lithological column and log data from said at least one wellbore;
   applying said second correlation to log data from said at least one wellbore to generate lithological information for at least one wellbore penetrating said region of interest;
   generating synthetic seismic data from log data from at least one wellbore penetrating the subsurface of said region of interest; and
   calculating attributes of said synthetic seismic data calculated from log data.

3. The method of claim 2 wherein the first said correlation is developed by applying said attributes of said synthetic seismic data and said lithological characteristics to an artificial neural network.

4. The method of claim 1 wherein said correlation between attributes of synthetic seismic data calculated from log data from at least one wellbore penetrating said region and lithological information from said at least one wellbore is generated by steps, comprising:
   developing lithological information from log data for at least one wellbore penetrating said region of interest;
   generating synthetic seismic data from log data from at least one wellbore penetrating the subsurface of said region of interest; and
   calculating attributes of said synthetic seismic data calculated from log data.

5. The method of claim 4 wherein the first said correlation is developed by applying said attributes of said synthetic seismic data and said lithological characteristics to an artificial neural network.

6. The method of claim 1 wherein said estimate comprises output data stored on a storage medium, and said method further comprising generating a visual display from said output data.

7. A method for generating an estimate of lithological characteristics of a region of the earth's subsurface penetrated by a plurality of wellbores, comprising:

developing a lithological column from core data from at least one of said wellbores;

developing a correlation between said lithological column and log data from said at least one of said wellbores;

utilizing log data from at least one of said wellbores to develop log data representing at least one model well;

applying said correlation between said lithological column and log data to log data from said plurality of wellbores and said at least one model well to generate lithological information for said plurality of wellbores and said at least one model well;

calculating synthetic seismic traces from log data from said plurality of wellbores and from said at least one model well;

calculating attributes of said synthetic seismic traces;

generating a correlation between said attributes of said synthetic seismic traces and said lithological information;

calculating attributes of recorded seismic traces from said region; and applying said correlation between said attributes of said synthetic seismic traces and said lithological information to said attributes of recorded seismic traces to generate said estimate of lithological characteristics.

8. The method of claim 7 wherein said estimate comprises output data stored on a storage medium, and said method further comprising generating a visual display from said output data.

9. A method for generating an estimate of lithological characteristics of a region of the earth's subsurface penetrated by a plurality of wellbores, comprising:

developing a lithological column from core data from at least one of said wellbores;

developing a correlation between said lithological column and log data from said at least one of said wellbores;

applying said correlation between said lithological column and log data to log data from said plurality of wellbores to generate lithological information for said plurality of wellbores;

calculating synthetic seismic traces from log data from said plurality of wellbores;

calculating attributes of said synthetic seismic traces;

generating a correlation between said attributes of said synthetic seismic traces and said lithological information;

calculating attributes of recorded seismic traces from said region; and applying said correlation between said attributes of said synthetic seismic traces and said lithological information to said attributes of recorded seismic traces to generate said estimate of lithological characteristics.

10. A method for generating an estimate of lithological characteristics of a region of the earth's subsurface penetrated by a plurality of wellbores, comprising:

utilizing log data to generate lithological information for said plurality of wellbores;

utilizing log data from at least one of said wellbores to develop log data representing at least one model well;

calculating synthetic seismic traces from log data from said plurality of wellbores and said at least one model well;

calculating attributes of said synthetic seismic traces;

generating a correlation between said attributes of said synthetic seismic traces and said lithological information;

calculating attributes of recorded seismic traces from said region; and applying said correlation between said attributes of said synthetic seismic traces and said lithological information to said attributes of recorded seismic traces to generate said estimate of lithological characteristics.

11. A method for generating an estimate of lithological characteristics of a region of the earth's subsurface penetrated by a plurality of wellbores, comprising:

utilizing log data to generate lithological information for said plurality of wellbores;

calculating synthetic seismic traces from log data from said plurality of wellbores;

calculating attributes of said synthetic seismic traces;

generating a correlation between said attributes of said synthetic seismic traces and said lithological information;

calculating attributes of recorded seismic traces from said region; and applying said correlation between said attributes of said synthetic seismic traces and said lithological information to said attributes of recorded seismic traces to generate said estimate of lithological characteristics.

12. A device adapted for use by a digital computer wherein a plurality of computer instructions readable by said digital computer are encoded, which instructions instruct the computer to perform a process comprising:

generating a correlation between attributes of synthetic seismic data calculated from log data from at least one wellbore penetrating said region and lithological information from said at least one wellbore; and applying said correlation to attributes of recorded seismic traces from said region of the earth's subsurface to generate said estimate.

13. The device of claim 12 wherein said device is selected from the group consisting of a magnetic tape, a magnetic disk, and an optical disk.

* * * * *